US009537903B2

(12) United States Patent
Maria et al.
(10) Patent No.: US 9,537,903 B2
(45) Date of Patent: Jan. 3, 2017

(54) METHOD AND APPARATUS FOR COMMUNICATING BETWEEN COMMUNICATION DEVICES

(71) Applicant: AT&T Mobility II, LLC, Atlanta, GA (US)

(72) Inventors: Arturo Maria, Bellevue, WA (US); Thomas J. Routt, Edmonds, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 360 days.

(21) Appl. No.: 14/066,406

(22) Filed: Oct. 29, 2013

(65) Prior Publication Data

US 2015/0120841 A1 Apr. 30, 2015

(51) Int. Cl.
*H04L 29/06* (2006.01)

(52) U.S. Cl.
CPC ......... *H04L 65/104* (2013.01); *H04L 65/1016* (2013.01); *H04L 65/1083* (2013.01)

(58) Field of Classification Search
CPC . H04L 65/1083; H04L 65/104; H04L 65/1016
See application file for complete search history.

(56) References Cited

U.S. PATENT DOCUMENTS 6,385,583 B1 5/2002 Ladd et al.
6,920,425 B1 7/2005 Will et al.
(Continued)

FOREIGN PATENT DOCUMENTS

| | | | |
|---|---|---|---|
| CA | 2555102 | C | 2/2013 |
| CN | 1368719 | A | 9/2002 |
| EP | 1041801 | A2 | 10/2000 |
| EP | 1249765 | A1 | 10/2002 |
| WO | 2013122949 | A1 | 8/2013 |

OTHER PUBLICATIONS

Davids, et al., "SIP APIs for voice and video communications on the web", Proceedings of the 5th International Conference of Principles, Systems and Applications of IP Telecommunications, ACM, 2011.*
(Continued)

*Primary Examiner* — Suraj Joshi
(74) *Attorney, Agent, or Firm* — Guntin & Gust, PLC; Douglas Schnabel

(57) ABSTRACT

Aspects of the subject disclosure may include, for example, receiving from a web real-time communications gateway a first request for communication services from a network resource, where the network resource does not utilize a web real-time communications protocol and where the first request is compliant with a markup language that differs from the web real-time communications protocol, directing the network resource to provide the communication services identified in the first request, receiving a first message from the web real-time communications gateway, where the first message is compliant with the markup language, translating the first message to a first updated message conforming to a protocol used by the network resource, where protocol differs from the markup language used for communicating with the web real-time communications gateway, and transmitting the updated first message to the network resource facilitating the communication services identified in the first request. Other embodiments are disclosed.

20 Claims, 7 Drawing Sheets

(56) References Cited

U.S. PATENT DOCUMENTS

| | | | |
|---|---|---|---|
| 6,981,041 | B2 | 12/2005 | Araujo et al. |
| 7,349,836 | B2 | 3/2008 | Da Palma et al. |
| 7,366,777 | B2 | 4/2008 | Hill et al. |
| 7,590,542 | B2 | 9/2009 | Williams et al. |
| 7,890,594 | B2 | 2/2011 | Da Palma et al. |
| 7,954,051 | B2 | 5/2011 | Achilles et al. |
| 8,104,024 | B2 | 1/2012 | Berranger |
| 8,326,632 | B2 | 12/2012 | Dodrill et al. |
| 8,478,588 | B2 | 7/2013 | Da Palma et al. |
| 8,494,139 | B2 | 7/2013 | Byrne et al. |
| 2003/0055651 | A1 | 3/2003 | Pfeiffer et al. |
| 2007/0016680 | A1 | 1/2007 | Burd et al. |
| 2007/0026852 | A1 | 2/2007 | Logan et al. |
| 2009/0132910 | A1 | 5/2009 | Cseri et al. |
| 2010/0299590 | A1 | 11/2010 | Gissler et al. |
| 2014/0280995 | A1* | 9/2014 | Ezell .................. H04L 65/1016 709/229 |

OTHER PUBLICATIONS

Aboba, Bernard et al., "Emergency Services Support in WebRTC", http://tools.ietf.org/html/draft-aboba-rtcweb-ecrit-00, 2012.

Davids, Carol et al., "SIP APIs for voice and video communications on the web", Proceedings of the 5th International Conference on Principles, Systems and Applications of IP Telecommunications, ACM, 2011.

Lucas, Bruce , "VOICEXML", Communications of the ACM 43.9, 2000.

Meyn, Antony , "Browser to browser media streaming with HTML5", https://aaltodoc.aalto.fi/bitstream/handle/123456789/6094/master_meyn_antony_j_r_2012.pdf?sequence=1, 2012.

Rodriguez, Pedro et al., "Advanced videoconferencing services based on webrtc", http://www.researchgate.net/publication/235639869_Advanced_Videoconferencing_Services_Based_on_WebRTC/file/9fcfd51233ddc9a053.pdf, 2012.

* cited by examiner

100

200

300

400

SHO
411
SHS
410
430
462
VHO 1
VHO 2
ISP
Network
432
463
VHO 3
VHO 6
435
412
VHO 4
VHO 5
414
VHS
418
429
ACCESS NETWORK
417
415
419
Satellite dish
receiver 431
408
466
STB 406
G 404
Ctrl 407
416
ISP Ntwk 432
STB 406
Cable TV
433
464
402
408
Remote
Services

500

METHOD AND APPARATUS FOR COMMUNICATING BETWEEN COMMUNICATION DEVICES

FIELD OF THE DISCLOSURE

The subject disclosure relates to a method and apparatus for communicating between communication devices.

BACKGROUND

Web Real-Time Communications (WebRTC) is an application programming interface (API) definition being developed by the World Wide Web Consortium (W3C) and a companion RTCWEB Internet Engineering Task Force (IETF) group to enable runtime platform-independent browser-to-browser applications supporting voice calling, video chat, and peer-to-peer (P2P) file sharing without the need for plugins.

BRIEF DESCRIPTION OF THE DRAWINGS

Reference will now be made to the accompanying drawings, which are not necessarily drawn to scale, and wherein.

DETAILED DESCRIPTION

Figure 1:
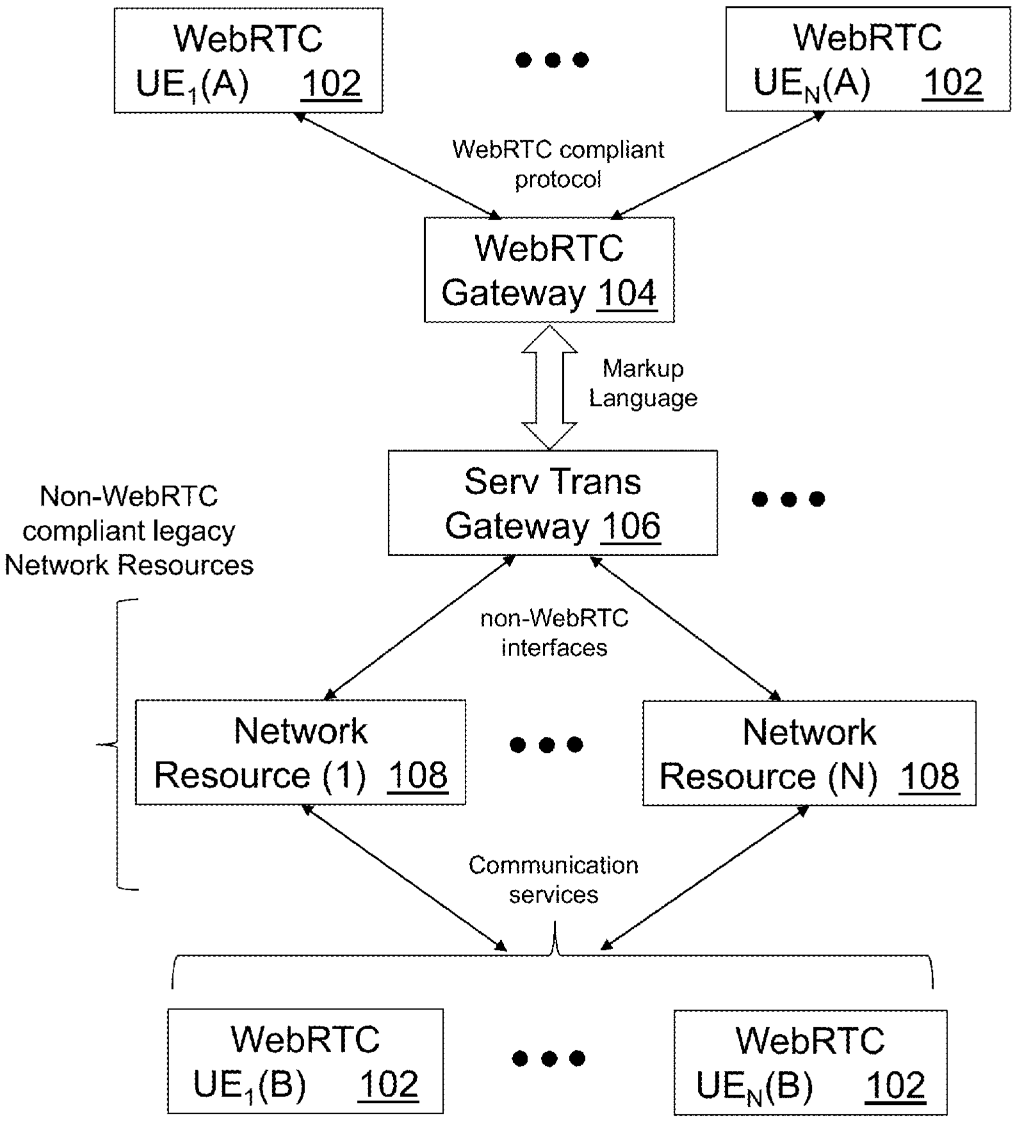
FIG. 1 depicts an illustrative embodiment of a system.

The subject disclosure describes, among other things, illustrative embodiments of a service translation system to reduce the complexity of deploying a WebRTC gateway that interacts with legacy network resources of a communication system. Other embodiments are included in the subject disclosure.

One embodiment of the subject disclosure includes a method for receiving, by a web real-time communications gateway comprising a processor, a first request from a mobile communication device identifying communication services requested from a network resource that does not utilize a web real-time communications protocol used by the web real-time communications gateway, where the first request is compliant with the web real-time communications protocol, generating, by the web real-time communications gateway, a second request comprising a markup language that differs from the web real-time communications protocol, where the markup language is used by a service translation gateway that interfaces the web real-time communications gateway to a plurality of network resources that do not conform to the web real-time communications protocol, and where the plurality of network resources includes the network resource identified in the first request, transmitting, by the web real-time communications gateway, the second request to the service translation gateway to cause the service translation gateway to facilitate the communication services of the network resource identified in the first request, receiving, by the web real-time communications gateway, a first message from the mobile communication device, where the first message is compliant with the web real-time communications protocol used by the web real-time communications gateway, translating, by the web real-time communications gateway, the first message to a first updated message conforming to the markup language used by the service translation gateway, and transmitting, by the web real-time communications gateway, the updated first message to the service translation gateway for delivery to the network resource facilitating the communication services identified in the first request.

One embodiment of the subject disclosure includes a machine-readable storage medium having executable instructions. Execution of the instructions by a processor, can cause the processor to perform operations including receiving a first request from a communication device requesting communication services from a network resource that does not utilize a web real-time communications protocol, where the first request is compliant with the web real-time communications protocol, generating a second request comprising a markup language that differs from the web real-time communications protocol, where the markup language is used by a service translation gateway that interfaces to a plurality of network resources that do not utilize the web real-time communications protocol, and where the plurality of network resources includes the network resource identified in the first request, transmitting the second request to the service translation gateway to facilitate the communication services of the network resource identified in the first request, receiving a first message from the communication device, where the first message is compliant with the web real-time communications protocol, translating the first message to a first updated message conforming to the markup language used by the service translation gateway, and transmitting the updated first message to the service translation gateway for delivery to the network resource facilitating the communication services identified in the first request.

One embodiment of the subject disclosure includes a service translation gateway having a memory to store executable instructions, and a processor coupled to the memory. Execution of the instructions by the processor can cause the processor to perform operations including receiving from a web real-time communications gateway a first request for communication services from a network resource, where the communication services are requested by a communication device communicatively coupled to the web real-time communications gateway, where the network resource does not utilize a web real-time communications protocol used by the web real-time communications gateway, and where the first request is compliant with a markup language that differs from the web real-time communications protocol, directing the network resource to provide the communication services identified in the first request, receiving a first message from the web real-time communications gateway, where the first message is compliant with the markup language, translating the first message to a first updated message conforming to a protocol used by the network resource, where protocol differs from the markup language used for communicating with the web real-time communications gateway, and transmitting the updated first message to the network resource facilitating the communication services identified in the first request.

FIG. 1 depicts an illustrative embodiment of a system 100. System 100 can comprise a WebRTC gateway 104 providing services to user equipment (UE) 102 executing WebRTC compliant applications. The WebRTC gateway 104 can be a server or another suitable computing device executing software that mimics in whole or in part the WebRTC standard or protocol promulgated by the world wide web consortium (W3C), an internet engineering task force (IETF) group, or a combination of the two. UE 102 shown in FIG. 1 can represent smart phones, laptop computers, tablets, desktop computers, or any other suitable computing device with communication resources. WebRTC compliant applications can be a web browser that utilizes software programs (e.g., Javascripts) that mimic the WebRTC application program interface (API) specifications defined by the WebRTC standard or protocol. Assisted by the WebRTC gateway 104, WebRTC browsers can support runtime platform-independent browser-to-browser applications such as voice calls, video chat, and peer-to-peer (P2P) file sharing without the need for plugins. As shown in FIG. 1, WebRTC compliant UE 102 communicates with a WebRTC server using a WebRTC compliant protocol.

There are many legacy network resources 108 of a communication system (such as a cellular telephony system) that are not WebRTC compliant. For example, there are many short message service (SMS) servers and multimedia messaging service (MMS) servers deployed throughout cellular systems around the world that provide communication services to a large community of UEs 102 which may not be WebRTC compliant. It is conceivable that legacy network resources 108 such as SMS and MMS servers can be upgraded to support a WebRTC protocol. However, it would be too costly to upgrade such systems, especially if some of these systems were to be replaced or phased out over time. Similarly, it is conceivable that a WebRTC gateway 104 can be configured with all known proprietary interfaces of legacy network resources 108. However, developing a universal interface that supports all proprietary interfaces would likely be commercially unviable and would likely delay the deployment of WebRTC services.

To overcome these challenges, a service translation gateway 106 can be used that provides a common interface to the WebRTC gateway 104 utilizing a markup language that provides access to all legacy network resources 108. More than one service translation gateway 106 can be used to support different clusters of legacy network resources 108. Accordingly, it is not necessary for a single model of a service provider of service translation gateways 106 to supports all proprietary interfaces. The only requirement for all models of the service translation gateways 106 is to provide a common communications interface to the WebRTC gateway 104 by way of a predefined markup language that enables the WebRTC to request services from any legacy non-WebRTC compliant network resource without requiring the WebRTC gateway 104 to directly communicate with the legacy network resources 108. The service translation gateway 106 can thus eliminate the need for the WebRTC gateway 104 to communicate over the proprietary interfaces or protocols of the network resources 108, thereby simplifying the deployment of WebRTC gateways 104. As the demand for WebRTC compliant devices grows, various models of service translation gateways 106 can be deployed to support different legacy network resources 106.

Figure 2:
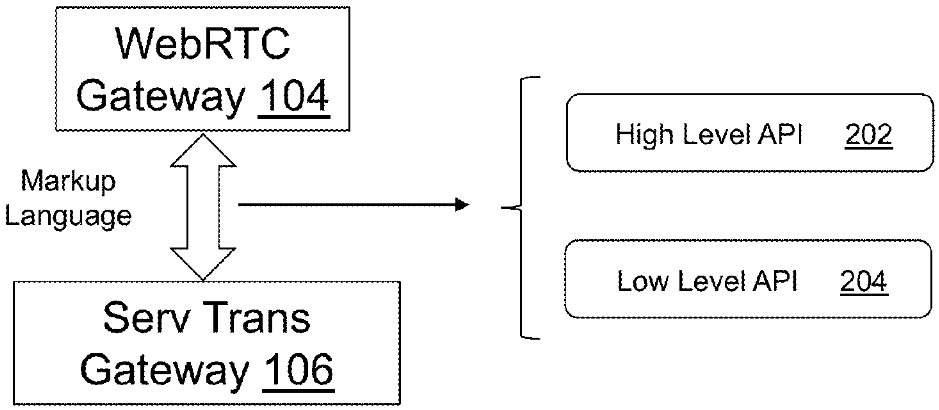
FIG. 2 depicts an illustrative embodiment of application programming interfaces used in parts of the system of FIG. 1.

FIG. 2 depicts an illustrative embodiment of high-level and low-level language application programming interfaces (APIs) 202, 204 which can be used in the markup language utilized by the WebRTC gateway 104 and the service translation gateway 106. The high-level language API (HLLAPI) 202 can provide a system-independent WebRTC gateway 104 a Meta-API structured programming interface runtime environment to accelerate and improve the performance of service translation gateways 106, thereby improving throughput across a plurality of heterogeneous, distributed WebRTC gateways 104 and network application processing environments of the service translation gateways 106.

The purpose of a Low-Level Application Programming Interface (LLAPI) 204 is to provide a plurality of WebRTC gateways 104 and service translation gateways 106 processing environment-dependent structured programming interfaces which—in concert with the HLLAPI and Meta-API, and the markup language used between the WebRTC gateways 104 and service translation gateways 106—accelerate and improve the computing platform performance and throughput of WebRTC gateways 104 and service translation gateways 106 across a plurality of heterogeneous, distributed processing platforms and runtime environments.

The markup language can provide the WebRTC gateway 104 and the service translation gateway 106 a dataset and file markup language for structuring and presenting WebRTC content for use within a plurality of proprietary standalone network application environments, and a plurality of heterogeneous, distributed network application environments, World Wide Web and Internet processing environments, Intranet processing environments, and Extranet processing environments.

Figure 3:
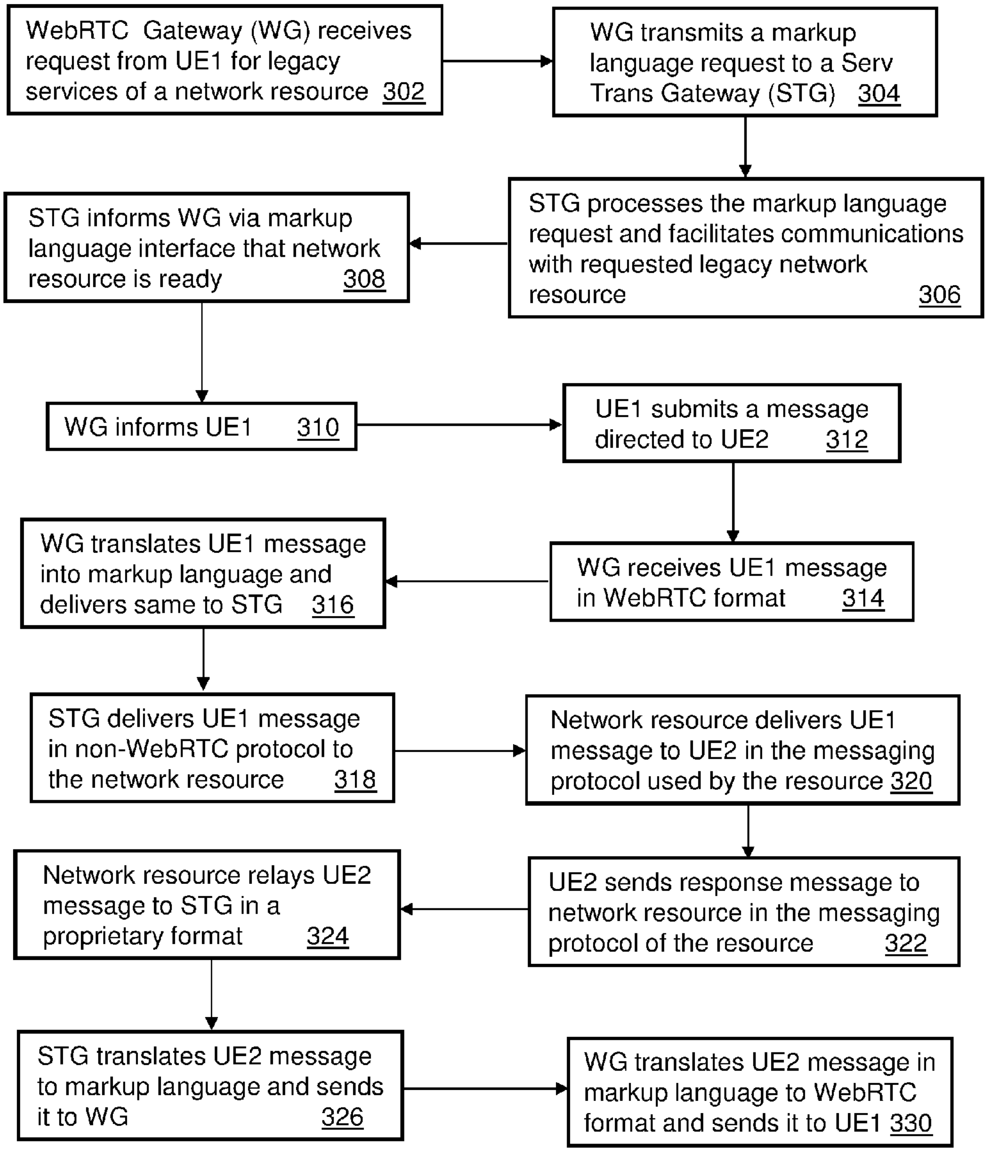
FIG. 3 depicts an illustrative embodiment of a method used by the system described in FIG. 1.

FIG. 3 depicts an illustrative embodiment of a method 300 used by the system 100 of FIG. 1. Method 100 can begin with step 302 where the WebRTC gateway 104 receives a service request from UE1 for legacy services of a specific network resource 108 to engage in communications with another UE2. The legacy services can be, for example, a user of UE1 trying to send an SMS message to another user of UE2. At step 304, the WebRTC gateway 104 can transmit a markup language request to the service translation gateway 106. The markup language request can identify a specific legacy network resource 108 that is be requested by UE1. In step 306, the service translation gateway 106 can in turn process the markup language request and facilitate communications with the requested legacy network resource 108 according to the communication protocol used by the network resource 108.

At step 308, the service translation gateway 106 can inform the WebRTC gateway 104 using the markup language described earlier that the network resource 108 is ready. At step 310, the WebRTC gateway can inform UE1 using the WebRTC protocol that that the network resource 108 is ready. UE1 at step 312 can initiate a message directed to UE2. The WebRTC gateway 104 receives the message from UE1 at step 314 using the WebRTC protocol, and translates the message at step 316 using the markup language and delivers it to the service translation gateway 106. The service translation gateway 106 in turn extracts the UE1 message from the markup language and delivers the UE1 message to the network resource 108 in the non-WebRTC protocol of the network resource 108 in step 318. At step 320, the network resource 108 delivers the UE1 message to UE2 utilizing the messaging protocol used by that system (e.g., SMS or MMS protocols, or other protocols of other messaging services).

The foregoing process can be applied also in the reverse. For example, at step 322 the user of UE2 can send a response message to the network resource 108 in the messaging protocol used by the network resource 108. At step 324 the network resource 108 can provide the UE2 message to the service translation gateway 106 over its proprietary interface. At step 326, the service translation gateway 106 can insert the UE2 message into the markup language and deliver it to the WebRTC gateway 104. The WebRTC gateway 104 can in turn extract the UE2 message from the markup language and deliver the UE2 message at step 330 to UE1 using the WebRTC protocol.

The foregoing embodiments substantially reduce the complexity and cost of deploying WebRTC gateways 104 and related WebRTC applications by providing WebRTC gateways 104 a common or unified communications interface to request services from legacy network resources 108 by way of the service translation gateway 105, which shields the WebRTC gateways 104 from the many legacy network resource protocols and proprietary interfaces presently in use, thereby enabling rapid deployment of WebRTC gateways 104 and WebRTC compliant devices and applications.

Figure 4:
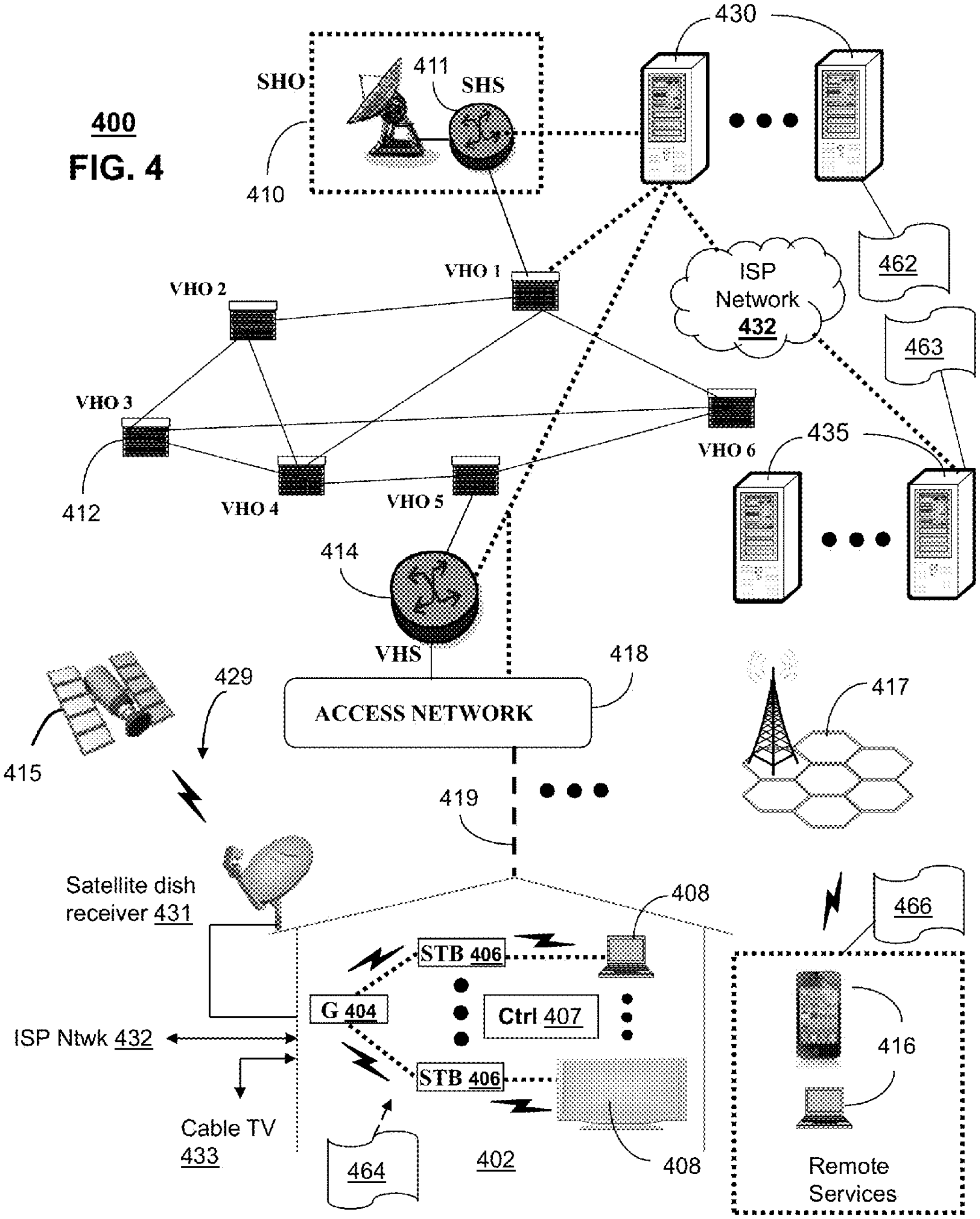
FIGS. 4-5 depict illustrative embodiments of communication systems that provide media services configured according to the method of FIG. 3.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. Some of the devices depicted in communication system 400 can be configured to use portions of method 300 to enable WebRTC applications with non-WebRTC compliant legacy devices.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a service translation gateway (herein referred to as service translation gateway 430). Similarly, communication system 400 can also provide for all or a portion of the computing devices 435 to function as a WebRTC gateway (herein referred to as WebRTC gateway 435). The service translation gateway 430 and the WebRTC gateway 435 can use computing and communication technology to perform functions 462 and 463, respectively, which can include among other things, the functions described in method 300 of FIG. 3. The media processors 406 and wireless communication devices 416 can be provisioned with software functions 462 and 466, respectively, to utilize the services of the service translation gateway 430 and the WebRTC gateway 435.

Multiple forms of media services can be offered to media devices over landline technologies such as those described above. Additionally, media services can be offered to media devices by way of a wireless access base station 417 operating according to common wireless access protocols such as Global System for Mobile Communications or GSM, Code Division Multiple Access or CDMA, Time Division Multiple Access or TDMA, Universal Mobile Telecommunications System or UMTS, Worldwide interoperability for Microwave Access or WiMAX, Software Defined Radio or SDR, Long Term Evolution or LTE, LTE Advanced or LTE-A, and so on. Other present and next generation wide area wireless access network technologies can be used in one or more embodiments of the subject disclosure.

Figure 5:
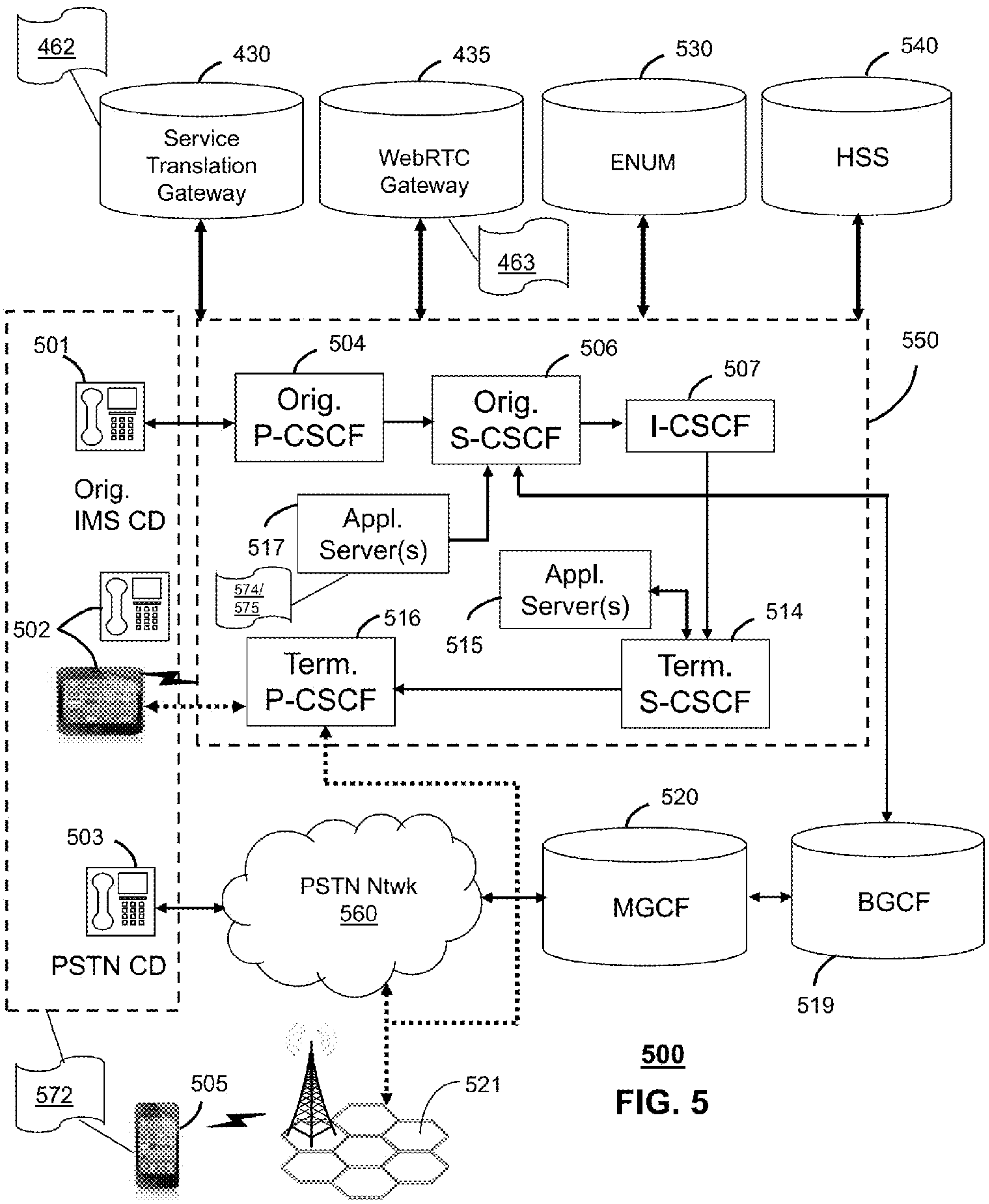

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Some of the devices depicted in communication system 400 can be configured to use portions of method 300 to enable WebRTC applications with non-WebRTC compliant legacy devices.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The service translation gateway 430 and the WebRTC gateway 435 of FIG. 4 can be operably coupled to the second communication system 500 for purposes similar to those described above. The service translation gateway 430 and the WebRTC gateway 435 can perform function 462 and 463, respectively, and thereby enable the CDs 501, 502, 503 and 505 of FIG. 5 to access to services provided by legacy non-WebRTC network resources as described earlier. CDs 501, 502, 503 and 505, which can be adapted with software to perform function 572 to utilize the services of the service translation gateway 430 and the WebRTC gateway 435. In one embodiment the service translation gateway 430 and/or the WebRTC gateway 435 can be an integral part of the application server(s) 517 performing function 574 or 575, which can be substantially similar to functions 462 and 462, respectively, and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
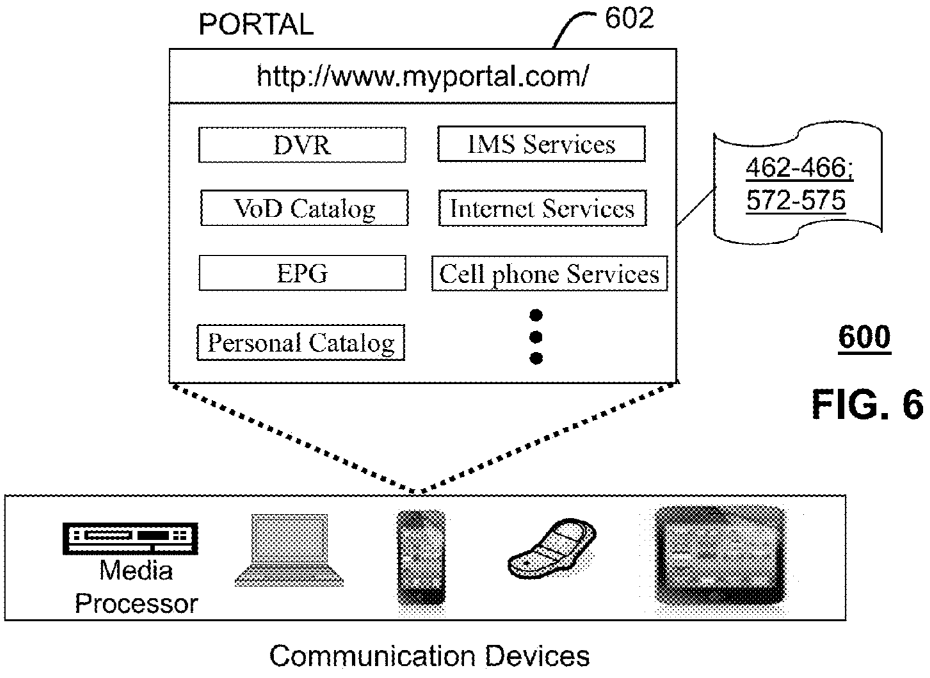
FIG. 6 depicts an illustrative embodiment of a web portal for interacting with the communication systems of FIGS. 1 and 4-5.

FIG. 6 depicts an illustrative embodiment of a web portal 602 which can be hosted by server applications operating from the computing devices 430 of the communication system 100 illustrated in FIG. 1. Communication system 600 can be communicatively coupled with system 100, communication 400, and/or communication system 500. The web portal 602 can be used for managing services of system 100 and communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-575 to adapt these applications as may be desired by subscribers and service providers of system 100 and communication systems 400-500.

Figure 7:
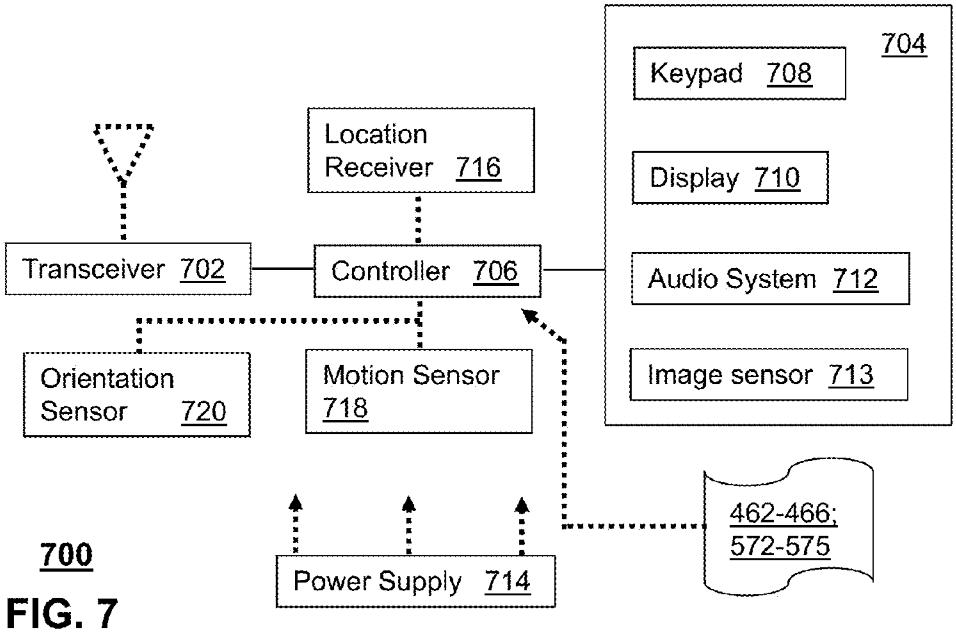
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and 4-5. Communication device 700 in whole or in part can represent any of the communication devices described in FIGS. 1 and 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-575, respectively.

Upon reviewing the aforementioned embodiments, it would be evident to an artisan with ordinary skill in the art that said embodiments can be modified, reduced, or enhanced without departing from the scope of the claims described below. For example, referring to FIG. 2, in one embodiment, the service translation gateway 106 can utilize the HLLAPI, LLAPI, and markup language elements for generating a WebRTC single-system image within a plurality of distributed, heterogeneous computing platform and runtime environments.

In another embodiment, HLLAPI used by the service translation gateway 106 can define a distributed, system-independent structured protocol boundary across which markup language requests, unstructured datasets, structured datasets, replies, error messages, and completion codes are sent and received.

In another embodiment, a plurality of HLLAPIs used by the service translation gateway 106 can be incorporated into the markup language.

In another embodiment, LLAPI used by the service translation gateway 106 can define a system-dependent structured protocol boundary across which markup language requests, unstructured datasets, structured datasets, replies, error messages, and completion codes are sent and received.

In another embodiment, a plurality of LLAPIs used by the service translation gateway 106 can be incorporated into the markup language.

In another embodiment, a plurality of standalone, system-dependent markup language LLAPI tags can be registered and cached to heterogeneous, distributed WebRTC runtime platforms and network computing environments.

In another embodiment, a plurality of WebRTC applications, processes and devices can access the service translation gateway 106 utilizing a plurality of markup language, HLLAPI, and LLAPI elements.

In another embodiment, the markup language used by the service translation gateway 106 can incorporate system-independent API operation syntactic tag elements, including <webrtcmetaapi>, <webrtcapitransform>, <webrtchllapi>, <webrtcllapi>, <webrtcgetUserMedia>, <webrtcPeerConnection>, <webrtcDataChannels>.

In another embodiment, the markup language used by the service translation gateway 106 can incorporate system-independent mathematical operation syntactic tag elements, including <webrtcvector>, <webrtcscalar>, <webrtcmatrixalgebra>, <webrtclinearalgebra>, <webrtcdiffcalculus>, <webrtcgeometry>, <webrtctrig>.

In another embodiment, the markup language used by the service translation gateway 106 can incorporate system-independent Boolean logic operation syntactic tag elements, including <webrtcAND>, <webrtcOR>, <webrtcNOT>, <webrtcNAND>, <webrtcNOR>, <webrtcXOR>, <webrtcXNOR>.

In another embodiment, the markup language used by the service translation gateway 106 can incorporate system-independent syntactic tag elements, including <webrtctext>, <webrtcfile>, <webrtcvoice>, <webrtcvideo>, <webrtcimage>, <webrtcvector>, <webrtcscalar>, <webrtcgenericobject>, <webrtcmathfn>, <webrtcalgorithm>, <webrtcgps>, <webrtcgis>, <webrtchtml>, <webrtcmetadata>, <webrtcsecurity>, <webrtcsynch>, <webrtcasynch>.

In another embodiment, the service translation gateway 106, HLLAPI, LLAPI, and markup language elements are power- and performance-optimized to a plurality of heterogeneous mobile devices and mobile applications.

In another embodiment, the service translation gateway 106, HLLAPI, LLAPI, and markup language elements function both with network presence and with no network presence.

In another embodiment, markup language elements used by the service translation gateway 106 can perform deep packet inspection (DPI) of markup language-tagged data.

In another embodiment, the service translation gateway 106, HLLAPI, LLAPI, and markup language elements are power- and performance-optimized to a plurality of Daytona, NELOS, Carrier IQ, Detractors, Mark the Spot, CDR, Tickets, Alarms, Boundary, RAN Feed, Network Stats, Network Config, Femtocell, Microcell, Capital Planning, MTi Incident, and Wi-Fi mobile, heterogeneous, distributed processing platforms and runtime environments.

In another embodiment, the service translation gateway 106, HLLAPI and LLAPI elements interface with a plurality of standalone and distributed, heterogeneous WebRTC computing environments.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
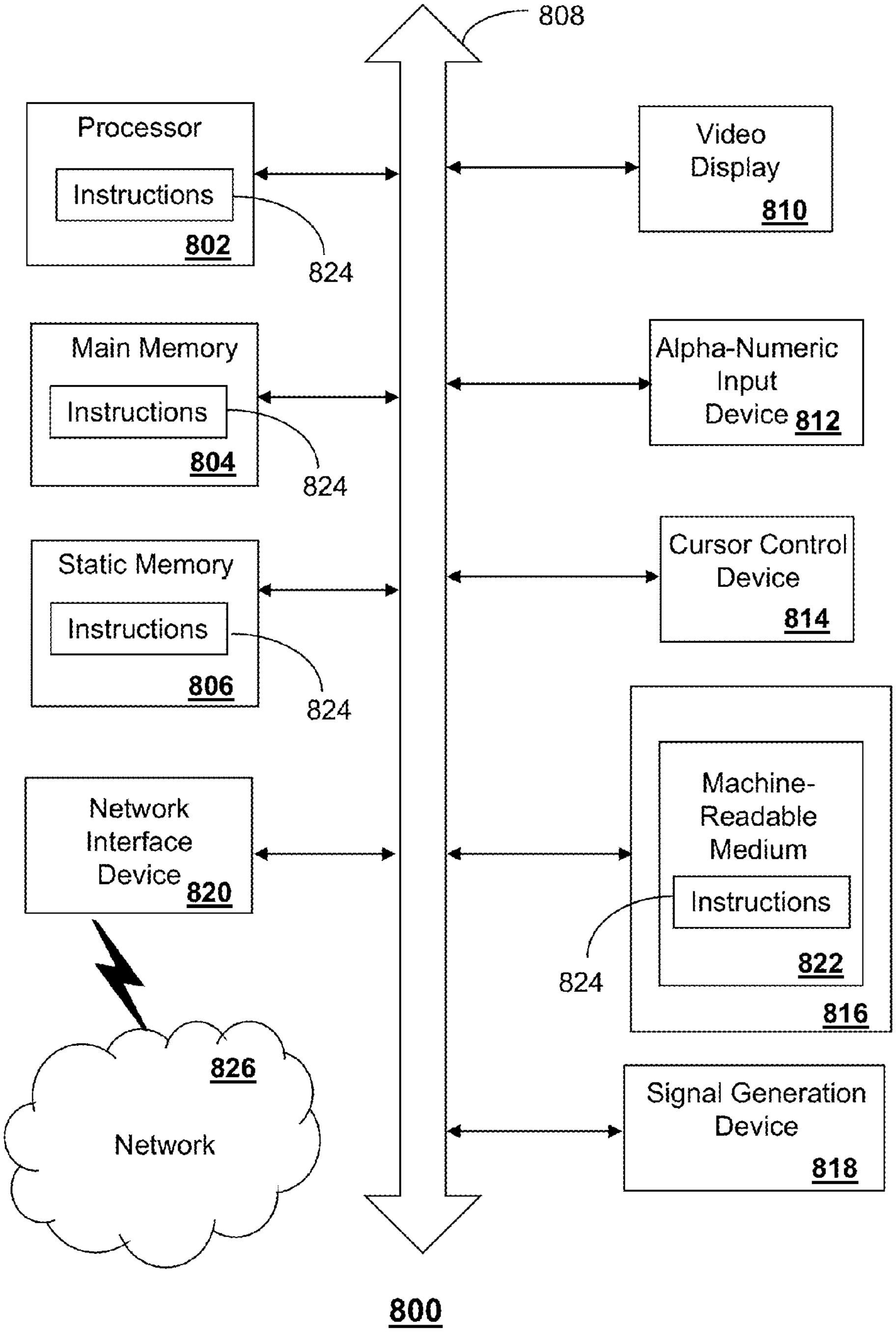
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the WebRTC gateway 104, 435, the service translation gateway 106, 430 and other devices of FIGS. 1, and 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, HTTPS) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE, LTE-A) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally distinguish between devices, components, steps or functions unless expressly stated otherwise. Additionally, one or more devices or components described with respect to the exemplary embodiments can facilitate one or more steps or functions, where the facilitating can include less than all of the steps needed to perform the function or can include all of the steps of function, such as facilitating access or facilitating establishing a connection.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving, by a web real-time communications gateway comprising a processor, a first request from a mobile communication device, wherein the first request identifies communication services of a network resource being requested by the mobile communication device, wherein the network resource does not utilize a web real-time communications protocol used by the web real-time communications gateway, wherein the first request is compliant with the web real-time communications protocol;

generating, by the web real-time communications gateway, a second request, wherein the second request conforms to a markup language that differs from the web real-time communications protocol, wherein the web real-time communications gateway generates messages conforming to the markup language to communicate with a service translation gateway, wherein the service translation gateway enables the web real-time communications gateway to interface to a plurality of network resources that do not conform to the web real-time communications protocol, wherein the plurality of network resources includes the network resource identified in the first request;

transmitting, by the web real-time communications gateway, the second request to the service translation gateway to cause the service translation gateway to facilitate the communication services of the network resource identified in the first request;

receiving, by the web real-time communications gateway, a first message from the mobile communication device, wherein the first message is compliant with the web real-time communications protocol used by the web real-time communications gateway;

translating, by the web real-time communications gateway, the first message to a first updated message conforming to the markup language used by the service translation gateway, wherein the web real-time communications gateway comprises a first application programming interface and a second application programming interface, wherein the first application programming interface provides a system-independent structured programming interface, wherein the second application programming interface provides an environment-dependent structured programming interface, and wherein the first updated message is translated using a plurality of system independent syntactic tag elements; and transmitting, by the web real-time communications gateway, the updated first message to the service translation gateway for delivery to the network resource facilitating the communication services identified in the first request.

2. The method of claim 1, further comprising receiving, by the web real-time communications gateway, a second updated message from the service translation gateway, wherein the second updated message is compliant with the markup language, and wherein the second updated message is generated by the service translation gateway responsive to translating a second message provided to the service translation gateway by the network resource while the network resource facilitates the communication services identified in the first request.

3. The method of claim 2, further comprising translating, by the web real-time communications gateway, the second updated message to a third message compliant with the web real-time communications protocol for delivery to the mobile communication device.

4. The method of claim 1, wherein a portion of the first message is directed to a second communication device by way of the web real-time communications gateway, the service translation gateway, and the network resource facilitating the communication services identified in the first request.

5. The method of claim 1, wherein a protocol used for communications between the service translation gateway and the network resource differs from the markup language used between the web real-time communications gateway and the service translation gateway.

6. The method of claim 1, wherein the network resource comprises a short message service server that does not utilize the web real-time communications protocol.

7. The method of claim 1, wherein the network resource comprises a multimedia messaging service server that does not utilize the web real-time communications protocol.

8. The method of claim 1, wherein the web real-time communication protocol is promulgated by in whole or in part by a world wide web consortium, an internet engineering task force group, or a combination thereof.

9. The method of claim 1, wherein the first application programming interface comprises a high-level application programming interface, and wherein the second application programming interface comprises a low-level application programming interface.

10. The method of claim 9, wherein the high-level application programming interface is utilized to improve a performance of communications between the web real-time communications gateway and the service translation gateway.

11. The method of claim 9, wherein the low-level application programming interface is utilized to improve a performance of computing resources used by the web real-time communications gateway or the service translation gateway.

12. A machine-readable storage medium, comprising instructions, wherein execution of the instructions by a processing system including a processor, causes the processing system to perform operations comprising:

receiving a first request from a communication device requesting communication services from a network resource that does not utilize a web real-time communications protocol, wherein the first request is compliant with the web real-time communications protocol;

generating a second request comprising a markup language that differs from the web real-time communications protocol, wherein the markup language is used for communicating with a service translation gateway that interfaces to a plurality of network resources that do not utilize the web real-time communications protocol, wherein the plurality of network resources includes the network resource identified in the first request, wherein the processing system comprises a first application programming interface and a second application programming interface, wherein the first application programming interface provides a system-independent structured programming interface, and wherein the second application programming interface provides an environment-dependent structured programming interface;

transmitting the second request to the service translation gateway to facilitate the communication services of the network resource identified in the first request;

receiving a first message from the communication device, wherein the first message is compliant with the web real-time communications protocol;

translating the first message to a first updated message conforming to the markup language used by the service translation gateway, wherein the first updated message is translated using a plurality of syntactic tag elements associated with the second application programming interface; and transmitting the updated first message to the service translation gateway for delivery to the network resource facilitating the communication services identified in the first request.

13. The machine-readable storage medium of claim 12, wherein the operations further comprise receiving a second updated message from the service translation gateway, wherein the second updated message is compliant with the markup language, and wherein the second updated message is generated by the service translation gateway responsive to translating a second message provided to the service translation gateway by the network resource.

14. The machine-readable storage medium of claim 13, wherein the operations further comprise translating the second updated message to a third message compliant with the web real-time communications protocol for delivery to the communication device.

15. The machine-readable storage medium of claim 12, wherein a portion of the first message is directed to a second communication device by way of the service translation gateway and the network resource facilitating the communication services identified in the first request.

16. The machine-readable storage medium of claim 12, wherein a protocol used for communications between the service translation gateway and the network resource differs from the markup language.

17. The machine-readable storage medium of claim 12, wherein the network resource comprises a short message service server or a multimedia messaging service server that does not utilize the web real-time communications protocol, and wherein the web real-time communication protocol is promulgated by in whole or in part by a world wide web consortium, an internet engineering task force group, or a combination thereof.

18. A service translation gateway, comprising:

a memory to store instructions; and a processing system including processor coupled to the memory, wherein execution of the instructions by the processing system, causes the processor to perform operations comprising:

receiving from a web real-time communications gateway a first request for communication services from a network resource, wherein the communication services are requested by a communication device communicatively coupled to the web real-time communications gateway, wherein the network resource does not utilize a web real-time communications protocol used by the web real-time communications gateway, wherein the first request is compliant with a markup language that differs from the web real-time communications protocol, wherein the service translation gateway comprises a first application programming interface and a second application programming interface, wherein the first application programming interface provides a system-independent structured programming interface, and wherein the second application programming interface provides an environment-dependent structured programming interface;

directing the network resource to provide the communication services identified in the first request;

receiving a first message from the web real-time communications gateway, wherein the first message is compliant with the markup language;

registering and caching a plurality of syntactic tags associated with the second application programming interface;

translating the first message to a first updated message conforming to a protocol used by the network resource, wherein protocol differs from the markup language used for communicating with the web real-time communications gateway, wherein the first updated message is translated using a plurality of syntactic tag elements; and transmitting the updated first message to the network resource facilitating the communication services identified in the first request.

19. The service translation gateway of claim 18, wherein the operations further comprise:

receiving a second message from the network resource, wherein the second message is compliant with the protocol used by the network resource;

translating the second message to an updated second message conforming to the markup language; and transmitting the updated second message to the web real-time communications gateway for delivery to the communication device after the web real-time communications gateway translates the updated second message to a third message compliant with the web real-time communications protocol.

20. The service translation gateway of claim 18, wherein a portion of the first message is directed to a second communication device by way of the network resource.

* * * * *